US000001808H

United States Statutory Invention Registration [19]

[11] Reg. Number: H1,808

Djiauw et al.

[45] **Published: *Oct. 5, 1999**

[54] EXTRUDABLE STYRENIC BLOCK COPOLYMER COMPOSITIONS CONTAINING A METALLOCENE POLYOLEFIN

[75] Inventors: Lie Khong Djiauw; Rodney Ray Pease, both of Houston, Tex.

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,354

[22] Filed: Nov. 26, 1996

Related U.S. Application Data

[60] Continuation of application No. 08/491,015, Jun. 15, 1995, which is a division of application No. 08/340,955, Nov. 17, 1994.

[51] Int. Cl.[6] ..... C08F 10/00

[52] U.S. Cl. ..... 524/505

[58] Field of Search ..... 264/184; 524/271, 524/274, 505; 525/98

[56] References Cited

U.S. PATENT DOCUMENTS

| | | | |
|---|---|---|---|
| 4,663,220 | 5/1987 | Wisneski et al. | 428/221 |
| 4,789,699 | 12/1988 | Kieffer et al. | 524/271 |
| 4,970,259 | 11/1990 | Mitchell et al. | 524/505 |
| 4,977,014 | 12/1990 | Mitchell et al | 428/221 |
| 5,068,138 | 11/1991 | Mitchell et al. | 428/220 |
| 5,093,422 | 3/1992 | Himes | 525/98 |
| 5,260,126 | 11/1993 | Collier, IV et al. | 428/288 |
| 5,272,236 | 12/1993 | Lai et al. | 526/348.5 |
| 5,320,899 | 6/1994 | Djiauw | 428/220 |
| 5,322,728 | 6/1994 | Davey et al. | 428/298 |
| 5,591,792 | 1/1997 | Hattori et al. | 524/271 |

FOREIGN PATENT DOCUMENTS

| | | |
|---|---|---|
| 9418263 | 8/1994 | WIPO . |

*Primary Examiner*—Charles T. Jordan
*Assistant Examiner*—Meena Chelliah

[57] ABSTRACT

An extrudable elastomeric composition for making elastic films having a recoverable energy greater than 60%, the composition includes an elastomeric block copolymer, a metallocene polyolefin, and a tackifying resin. The composition optionally may contain a crystalline polyolefin and an extending oil.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EXTRUDABLE STYRENIC BLOCK COPOLYMER COMPOSITIONS CONTAINING A METALLOCENE POLYOLEFIN

This is a continuation of application Ser. No. 08/491,015, filed Jun. 15, 1995 which is a divisional of Ser. No. 08/340,955, filed Nov. 17, 1994.

FIELD OF THE INVENTION

The present invention relates to extruding of elastomeric polymer compositions, more specifically to such compositions that are extruded as films.

BACKGROUND OF THE INVENTION

Extrudable elastomeric compositions which can be easily compression molded or melt blown into elastic sheets or films having low stress relaxation, low hysteresis, and high recoverable energy are described in U.S. Pat. Nos. 4,663,220, 4,789,699, and 5,093,422. The elastomeric sheets or films are useful in making stretchable laminates with stronger films for a variety of applications such as diaper waistbands and legbands.

Styrene-poly(ethylene-butylene)-styrene elastomeric block copolymers and styrene-poly(ethylene-propylene)-styrene elastomeric block copolymers have been blended with other materials such as, for example, polyolefins and tackifying resins to form extrudable elastomeric compositions which can be more easily extruded into elastic sheets having improved processing and/or bonding properties. While the additives improve the extrusion properties of the compositions and the processing and/or bonding properties of the elastic sheet, such additives may, in certain situations, have an adverse affect on the elastic properties of the resulting sheet. For example, such elastomeric block copolymers blended with large amounts of a polyolefin and/or hydrocarbon resin may have poor stress relaxation properties and stress-strain tests of such materials show significant hysteresis.

SUMMARY OF THE INVENTION

The present invention is an improved polymer composition for extruding sheets or films having recoverable energy greater than 60%, the composition comprising a metallocene polyolefin having a density from 0.86 to 0.91, a molecular weight distribution having a polydispersity less than 3, and good distribution of ethylene and from 8% to 30% by weight of an α-olefin comonomer having from 4 to 12 carbon atoms. The remaining components of the composition include elastomeric block copolymers, crystalline polyolefins, and tackifying resins.

DETAILED DESCRIPTION OF THE INVENTION

The extrudable elastomeric composition of the present invention is an improvement of the extrudable compositions described in U.S. Pat. No. 5,093,422 which description is incorporated by referencce herein. The known compositions include a styrenic block copolymer, typically a styrene-poly(ethylene-butylene)-styrene (S-EB-S) or a styrene-poly(ethylene-propylene)-styrene (S-EP-S) elastomeric block copolymer which is produced by hydrogenating a styrene-butadiene-styrene or styrene-isoprene-styrene block copolymer. The extrudable compositions may further comprise a crystalline polyolefin and a tackifying resin. The extrudable elastomeric composition may also include an extending oil.

In the present invention, a styrenic block copolymer is combined with a metallocene polyolefin having a density from 0.86 to 0.91, a molecular weight distribution having a polydispersity less than 3, and a good distribution of ethylene and from 8% to 30% by weight of an α-olefin comonomer having from 4 to 12 carbon atoms, preferably from 4 to 8 carbon atoms. The metallocene polyolefins are polyolefins produced with a metallocene catalyst as described in U.S. Pat. Nos. 5,322,728 and 5,272,236 which are descriptions are incorporated by referenece herein. Such elastomeric polyolefins are available from Dow Chemical Company under the trademark AFFINITY or ENGAGE (ethylene/octene copolymers) and from Exxon Chemical Company under the trademark EXACT (ethylene/butene copolymers). The metallocene polyolefins have low crystallinity when ethylene is copolymerized with from 8% to 30% by weight of an α-olefin comonomer having from 4 to 12 carbon atoms.

The styrenic block copolymers have at least two monoalkenyl arene blocks, preferably two polystyrene blocks, separated by a saturated block of a conjugated diene, preferably a saturated polybutadiene or a saturated polyisoprene block. The preferred S-EB-S and S-EP-S block copolymers comprise polystyrene endblocks having a number average molecular weight from 5,000 to 35,000 and saturated polybutadiene or saturated polyisoprene midblocks having a number average molecular weight from 20,000 to 170,000. The saturated polybutadiene blocks preferably have from 35% to 55% 1,2-configuration and the saturated polyisoprene blocks preferably have greater than 85% 1,4-configuration. The total number average molecular weight of the block polymer is preferably from 30,000 to about 250,000 if the polymer has a linear structure. Such block copolymers may have an average polystyrene content from 10% by weight to 35% by weight.

A S-EB-S block copolymer useful in the present invention is available from the Shell Chemical Company and has a number average molecular weight of about 50,000 with polystyrene endblocks each having a number average molecular weight of about 7,200 and polystyrene content of 30% by weight.

These polymers may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet, or the like.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

wherein R is an aliphatic, cycloaliphatic, aromatic, or alkyl-substituted aromatic hydrocarbon radical having from 1 to about 20 carbon atoms; and n is an integer of 1 to 4.

In addition to sequential techniques to obtain triblocks, tetrablocks, and higher orders of repeating structures, at least anionic initiators can be used to prepare diblocks of styrenepolydiene having a reactive ("live") chain end on the diene block which can be reacted through a coupling agent to create, for example, $(S\text{-}I)_x \cdot Y$ or $(S\text{-}B)_x \cdot Y$ structures wherein x is an integer from 2 to about 30, Y is a coupling agent, I is isoprene, B is butadiene and greater than 65 percent of S-I or S-B diblocks are chemically attached to the coupling agent. Y usually has a molecular weight which is low compared to the polymers being prepared and can be any of a number of materials known in the art, including halogenated organic compounds; halogenated alkyl silanes; alkoxy silanes; various esters such as alkyl and aryl benzoates, difunctional aliphatic esters such as dialkyl adipates and the like; polyfunctional agents such as divinyl benzene (DVB) and low molecular weight polymers of DVB. Depending on the selected coupling agent the final polymer can be a fully or partially coupled linear triblock polymer (x=2), i.e., S·I·Y·I·S; or branched, radial or star configurations. The coupling agent, being of low molecular weight, does not materially affect the properties of the final polymer. DVB oligomer is commonly used to create star polymers, wherein the number of diene arms can be 7 to 20 or even higher.

It is not required in coupled polymers that the diblock units all be identical. In fact, diverse "living" diblock units can be brought together during the coupling reaction giving a variety of unsymmetrical structures, i.e., the total diblock chain lengths can be different, as well as the sequential block lengths of styrene and diene.

Since the number of S-EB or S-EB polymeric arms in a star polymer can be large, the number average molecular weights of star polymers within the invention can be much larger than those of linear S-EB-S or S-EP-S polymers, i.e., up to 500,000 or higher. Such higher molecular weight polymers have the viscosity of lower molecular weight linear polymers and thus are processable in spite of the high molecular weight.

The polymers must be hydrogenated. In general, the hydrogenation or selective hydrogenation of the polymer may be accomplished using any of the several hydrogenation processes known in the prior art. For example the hydrogenation may be accomplished using methods such as those taught, for example, in U.S. Pat. Nos. 3,494,942; 3,634,594; 3,670,054; 3,700,633; and Re. 27,145, the disclosure of which patents are incorporated herein by reference. The methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl.

In general, the hydrogenation will be accomplished in a suitable solvent at a temperature within the range from about 20° C. to about 100° C. and at a hydrogen partial pressure within the range from about 100 psig to about 5,000 psig, preferably about 100 psig to 1,000 psig. Catalyst concentrations within the range from about 10 ppm (wt) to about 500 ppm (wt) of iron group metal based on total solution are generally used and contacting at hydrogenation conditions is generally continued for a period of time within the range from about 60 to about 240 minutes. After the hydrogenation is completed, the hydrogenation catalyst and catalyst residue will, generally, be separated from the polymer.

Various tackifying resins can be used in the present invention. In particular, the purpose of the tackifying resin is to provide an elastomeric web that can act as a pressure sensitive adhesive, e.g., to bond the elastomeric sheet to another web or layer of material. Of course, various tackifying resins are known, and are discussed, e.g., in U.S. Pat. Nos. 4,789,699; 4,294,936; and 3,783,072, the contents of which, with respect to the tackifier resins, are incorporated herein by reference. Any tackifier resin can be used which is compatible with the elastomeric polymer and the polyolefin, and can withstand the high processing (e.g., extrusion) temperatures. Generally, hydrogenated hydrocarbon resins are preferred tackifying resins, because of their better temperature stability. The following paragraphs disclose information on three specific tackifying resins, two of which (REGALREZ® and ARKON®P series tackifiers) are examples of hydrogenated hydrocarbon resins, and the ZONATAC®501 lite being a terpene hydrocarbon. Of course, while the three tackifying resins are specifically discussed, the present invention is not limited to use of such three tackifying resins, and other tackifying resins which are compatible with the other components of the composition and can withstand the high processing temperatures, and can achieve the objectives of the present invention, can also be used.

REGALREZ® hydrocarbon resins, a product of Hercules, Incorporated, are fully hydrogenated α-methyl styrene-type low molecular weight hydrocarbon resins, produced by polymerization and hydrogenation of pure monomer hydrocarbon feed stocks. Grades 1094, 3102, 6108, and 1126 are highly stable, light-colored low molecular weight, nonpolar resins suggested for use in plastics modification, adhesives, coatings, sealants, and caulks. The resins are compatible with a wide variety of oils, waxes, alkyds, plastics, and elastomers and are soluble in common organic solvents.

ZONATAC®501 lite resin, a product of Arizona Chemical Co., has a softening point of 105° C., a Gardner color (50% in heptane) of 1-and a Gardner color neat (pure) of 2+; (a Gardner color of 1-(50% in heptane) is approximately equal to APHA color =70) a specific gravity (25°/25° C.) of 1.02 and a flash point (closed cup, °F.) of 480° F.

The crystalline polyolefin which may be utilized in the extrudable composition must be one which, when blended with the elastomeric block copolymer or a mixture of elastomeric block copolymers and subjected to an appropriate combination of elevated pressure and elevated temperature conditions, is extrudable, in blended form, with the elastomeric block copolymer or a mixture of elastomeric block copolymers. In particular, preferred polyolefin materials include polyethylene, polypropylene, and polybutylene, including ethylene copolymers, propylene copolymers, and butylene copolymers. Blends of two or more of the polyolefins may be utilized.

One particular crystalline polyethylene may be obtained from Quantum Chemical, U.S.I. Div., under the trade designation Petrothene NA 601 (also referred to herein as PE NA 601). Information obtained from Quantum Chemical states that PE NA 601 is a low molecular weight, low density polyethylene for application in the areas of hot melt adhesives and coatings. Quantum Chemical has also stated that PE NA 601 has the following nominal values: (1) a Brookfield viscosity, cP at 150 degrees Centigrade of 8,500 and at 190 degrees Centigrade of 3,300 when measured in accordance with ASTM D 3236; (2) a density of 0.903 grams per cubic centimeter when measured in accordance with ASTM D 1505; (3) an equivalent Melt index of 2,000 grams per 10 minutes when measured in accordance with ASTM D 1238; (4) a ring and ball softening point of 102 degrees Centigrade when measured in accordance with ASTM E 28; (5) a tensile strength of 850 pounds per square inch when measured in accordance with ASTM D 638; (6) an elongation of 90 percent when measured in accordance with ASTM D 638; (7) a modulus of rigidity, Tf(45,000) of −34 degrees Centigrade; and (8) a penetration hardness (tenths of mm) at 77 degrees Fahrenheit of 3.6.

Extending oils which may be used in the extrudable elastomeric composition should be capable of being melt-processed with the other components of the extrudable elastomeric composition without degrading. An exemplary extending oil is a white mineral oil available under the trade designation Drakeol 34 from the Pennzoil Company Pennreco Division. Drakeol 34 has a specific gravity of 0.864–0.878 at 60° F., a flash point of 460° F., and viscosity of 370–420 SUS at 100° F. Suitable vegetable oils and animal oils or their derivatives may also be used as the extending oil.

The components of the extrudable elastomeric composition used to form the elastic sheet can be utilized over broad ranges of the amounts of each component. As a guide, the best results have been obtained when utilizing a five component extrudable elastomeric composition of an elastomeric block copolymer, a metallocene polyolefin, a crystalline polyolefin, a tackifying resin, and an extending oil. The following ranges, as shown in Table 1, are exemplary. It is emphasized that these ranges are merely illustrative, serving as a guide for amounts of the various components in the composition.

TABLE 1

| | Weight % |
|---|---|
| Elastomeric block copolymer, e.g. S-EB-S or S-EP-S | 25–70 |
| Metallocene Polyolefin | 15–60 |
| Tackifier | 15–58 |
| Crystalline Polyolefin | 0–25 |
| Extending Oil | 0–15 |

As stated previously, while the extrudable elastomeric composition used to form the elastic sheet has been discussed in terms of a five component extrudable composition, the crystalline polyolefin, which functions as a flow-promoter for the composition can be substituted by other compatible flow promoters or processing aids, or can be eliminated altogether where the tackifying resin can also act as the flow promoter and/or extending oil. The extending oil, which functions as a processing aid, may also be substituted by other compatible processing aids or can be eliminated altogether where the tackifying resin can also act as the extending oil. For example, low molecular weight hydrocarbon resins such as REGALREZ® tackifier can also act as the viscosity reducer and/or the extending oil, whereby the extrudable composition may contain the elastomeric polymer(s) and the tackifying resin (e.g., REGALREZ® tackifier).

While the principal components of the extrudable elastomeric composition used to form the elastic sheet have been described in the foregoing, such extrudable elastomeric composition is not limited thereto, and can include other components not adversely affecting the extrudable elastomeric composition attaining the stated objectives. Exemplary materials which could be used as additional components would include, without limitation, pigments, antioxidants, stabilizers, surfactants, waxes, flow promoters, solvents, particulates, and materials added to enhance processability and pellet handling of the composition.

DETAILED DESCRIPTION OF PREFERRED EMBODIMENTS

Extrudable elastic compositions were prepared by blending varying amounts of a S-EB-S thermoplastic elastomeric block copolymer (molecular weight 50,000) available from the Shell Chemical Company, a metallocene polyolefin available from Dow Chemical Company or Exxon Chemical Company, a polyolefin (Petrothene NA 601 polyethylene), a tackifying resin (REGALREZ®1126 hydrocarbon resin), and an extending oil (Drakeol 34 white mineral oil).

The term "elastic" is used herein to mean any material which, upon application of a biasing force, is stretchable, that is, elongatable at least about 60 percent (i.e., to a stretched, biased length which is at least about 160 percent of its relaxed unbiased length) and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be elongated by much more than 60 percent (i.e., much more than 160 percent of their relaxed length), for example, elongated 100 percent or more, and many of these will recover to substantially their initial relaxed length, for example, to within 105 percent of their initial relaxed length, upon release of the stretching force.

As used herein, the terms "recover" and "recovery" refer to a contraction of a stretched material upon termination of a biasing force following stretching of the material by application of the biasing force. For example, if a material having a relaxed, unbiased length of one (1) inch is elongated 50 percent by stretching to a length of one and one-half (1.5) inches the material would be elongated 50 percent (0.5 inch) and would have a stretched length that is 150 percent of its relaxed length. If this exemplary stretched material contracted, that is recovered to a length of one and one-tenth (1.1) inches after release of the biasing and stretching force, the material would have recovered 80 percent (0.4 inch) of its one-half (0.5) inch elongation. Recovery may be expressed as [(maximum stretch length—final sample length)/(maximum stretch length—initial sample length)]×100.

As used herein, the term "stress relaxation" refers to the percent loss of tension or load between the maximum load or force encountered after elongating an elastic material at a specified rate of extension to a predetermined length (or the load or force measured at some initial length) and the remaining load or force measured after the sample has been held at that length for a specified period of time, for example, from about 0 minutes to about 30 minutes. Except where otherwise noted for the present invention, stress relaxation is expressed as a percentage loss of the initial load encountered at a specified extension of an elastic material. The stress relaxation is determined by calculating the difference between the initial maximum load measured after elongating an elastic material at a rate of 20 inches per minute to an elongation of 160 percent (i.e., to 260 percent of the material's initial length) and the remaining load measured after that sample was held at that length for 30 minutes divided by the initial maximum load at that length. Testing may be performed on an Instron Model 1122 Universal Test Machine using a 100 mm by 3 inch sample attached to jaw faces that have a width of 3 inches and a height of 1 inch. Stress relaxation after 30 minutes at, for example, an elongation of 160 percent (i.e., to 260 percent of the material's initial length—from 100 mm to 260 mm) may be expressed as a percentage utilizing the following equation: stress relaxation=(peak $load_{160\%}$−$load_{160\%}$@30 min)/(peak $load_{160\%}$)*1OO.

As used herein, the term "tensile strength" refers to the resistance of an elastic material to being elongated as determined in accordance with ASTM D-412 using 3 mm wide (approximately 0.1 inch) and 0.060 inch thick dumbbell samples that are cut from films. Films formed from a blend of an elastomeric block copolymer and other materials such as, for example, a polyolefin (metallocene and/or crystalline), a tackifier, and/or an extending oil were compression molded. Tensile testing may be performed on an Instron Model 1122 Universal Test Machine. An alternative tensile test specimen is a 100 mm by 3 inch sample attached to jaw faces that have a width of 3 inches and a height of 1 inch.

As used herein, the term "recoverable energy" refers to the energy stored by an elastic material when it is elongated to a specified length. Recoverable energy is measured utilizing a tensile testing apparatus such as, for example, an Instron Model 1122 Universal Test Machine by elongating a sample of an elastic material sample at 1 inch/minute to 150 percent elongation (i.e., to 250 percent of the material's initial relaxed length) and cycling back to zero load for 1 hysteresis loop. The percent recoverable energy is determined by dividing the area under the retraction curve of the first hysteresis loop by the area under the elongation curve of the first hysteresis loop and then multiplying by 100.

As used herein, the term "loss" refers to the decrease in resistance to elongation of an elastic material after that elastic material has been elongated to a specified length and then allowed to recover. The loss is measured utilizing a tensile testing apparatus such as, for example, an Instron Model 1122 Universal Test Machine by elongating a sample of an elastic material sample at 1 inch/minute to 150 percent elongation (i.e., to 250 percent of the material's initial relaxed length), cycling back to zero load for 1 hysteresis loop and then elongating the material again at 1 inch/minute to 150 percent elongation. The percent loss is determined by dividing the area under the elongation curve of the second hysteresis loop by the area under the elongation curve of the first hysteresis loop, subtracting that value from one (1), and then multiplying by 100.

As used herein, the terms "set" or "percent set" refer to the deformation of an elastic material measured while the material is in a relaxed condition immediately after the material was released from a specified elongation, without allowing the material to snap back. The percent set is determined by dividing the zero load extension after 1 cycle by the initial sample gauge length, and then multiplying by 100. The zero load extension is the distance that the jaws of the tensile test equipment move at the beginning of the second cycle before a load is registered by the tensile test equipment. The set may be measured utilizing a tensile testing apparatus such as, for example, an Instron Model 1122 Universal Test Machine by elongating a sample of an elastic material at 1 inch/minute to 150 percent elongation and cycling back to zero load for 1 hysteresis loop.

As used herein, the term "set at break" refers to the deformation of an elastic material measured after the material has been elongated to break. The set at break is measured in accordance with ASTM D 412 in which, ten minutes after the sample is broken, the two pieces of the sample are fitted together so they substantially match up over the full area of the break. The percent set at break is determined by subtracting the original distance between the bench marks from the distance between the joined pieces, dividing by the original distance between the bench marks and then multiplying by 100.

As used herein, the "number average molecular weight" was determined utilizing conventional gel permeation chromatography techniques. All molecular weights are measured prior to hydrogenation which will increase them by a small amount.

Comparison Examples A and B

In Comparison Example A, the S-EB-S elastomer described above was compounded in a preferred formulation for making elastomeric films wherein the formulation contained 63% by weight of the S-EB-S elastomer, 20% by weight of a polyethylene resin, and 17% by weight of a tackifying resin. Comparative Examples B demonstrates complete replacement of the S-EB-S elastomer with Dow's ENGAGE EG 8100 elastomer, an elastomeric polyolefin having a molecular weight distribution having a polydispersity less than 3, good dispersion of 76% by weight of ethylene and 24% by weight of octene, and a density of 0.87.

EXAMPLE 1–3

Examples 1, 2, and 3 represent replacement of the crystalline polyolefin in Comparison Example A with a metallocene polyolefin having a molecular weight distribution having a polydispersity less than 3, good dispersion of ethylene and an α-olefin comonomer having from 4 to 8 carbon atoms, and a density from 0.86 to 0.91.

The weight % of each component for Comparison Examples A and B and Examples 1–3 is shown in Table 2. Extrudable compositions for each Example were pressed from pellets into films using heat and pressure according to conventional compression molding techniques. The films were cut into dumbbell shaped samples that were 3 mm wide (approximately 0.1 inch) and 0.060 inch thick. The stress-strain properties of the pressed films were determined in accordance with ASTM D-412 utilizing a Constant Rate of Extension Tester, Instron Model 1122 Universal Testing Instrument. Each sample was placed lengthwise in jaw faces, 3" wide×1" height, with a jaw span or separation of 2 inches. The Instron Model 1122 Universal Test Instrument crosshead speed was set at 10 inches per minute for the first series of tests measuring the Stress-Strain properties reported in Table 3. Measurements were taken of the sample's tensile strength, elongation at break, set, and modulus or load at 100% elongation (i.e., at 200% of the materials initial relaxed length) and 300% elongation (i.e., at 400% of the materials initial relaxed length).

TABLE 2

| Example | A | B | 1 | 2 | 3 |
|---|---|---|---|---|---|
| S-EB-S block copolymer a) | 63 | | 63 | 63 | 63 |
| Metallocene polyolefin | | | | | |
| 1 b) | | 63 | 20 | | |
| 2 c) | | | | 20 | |
| 3 d) | | | | | 20 |
| Crystalline Polyolefin 3) | 20 | 20 | | | |
| Tackifying resin f) | 17 | 17 | 17 | 17 | 17 |

a. Shell KRATONE ® G1659 S-EB-S polymer (70% coupled, 30% styrene, Target Mn = 7,200-35,600-7,200) from Shell Chemical Co.
b. Engage ® EG 8100 polymer (24% octene, dens. 0.87) from Dow.
c) Affinity ® PL1845 polymer (9.5% octene, dens. 0.903) from Dow.
d) Affinity ® PL 1880 polymer (12% octene, dens. 0.902) from Dow.
e. Petrothene NA 601-04 polyethylene from Quantum Chemical Co.
f. Regalrez 1126 hydrocarbon resin from Hercules Chemical Co.

Hysteresis properties were measured using the Instron Model 1122 Universal Test Machine with the crosshead speed set at 1 inch per minute. The loss, dynamic, recoverable energy and set were determined as previously described in the "Definition" section and are reported in Table 3.

The results show that Comparison Example B has significantly reduced recoverable energy and is thus has poor elastomeric properties in comparison to Comparison Example A. Examples 1–3 have improved tensile strength and improved recoverable energy in comparison to Comparison Example A.

TABLE 3

| Example | A | B | 1 | 2 | 3 |
|---|---|---|---|---|---|
| Melt flow, g/10' 190° C./2.16 Kg | 16 | 4.2 | 4.9 | 5.9 | 5 |
| Stress-strain Properties: (10 in/min crosshead speed) | | | | | |
| 100% modulus, psi | 189 | 358 | 150 | 180 | 180 |
| 300% modulus, psi | 274 | 522 | 235 | 330 | 330 |
| 500% modulus, psi | 420 | 720 | 380 | 570 | 560 |
| Tensile strength, psi | 1380 | 1549 | 1410 | 1720 | 1800 |
| Elongation at break, % | 860 | 852 | 900 | 870 | 880 |
| Hysteresis Properties: (Loop 1, 1 in/min crosshead speed) | | | | | |
| Recovery energy, % | 66 | 47 | 78 | 74 | 75 |
| Hysteresis set, % | 14 | 23 | 11 | 14 | 14 |
| Unloading stress, @ 100% elongation, psi | | | | | |
| First loading | 134 | 182 | 125 | 139 | 139 |
| Second loading | 130 | 178 | 120 | 135 | 135 |

EXAMPLES 4 AND 5

Examples 4 and 5 represent replacement of a portion of the block copolymer in Comparison Example A with a metallocene polyolefin having a molecular weight distribution having a polydispersity less than 3, good dispersion of ethylene and an α-olefin comonomer having from 4 to 8 carbon atoms, and a density from 0.86 to 0.91.

The weight % of each component for Comparison Example A and Examples 4 and 5 is shown in Table 4. Extrudable compositions for each Example were used to compression mold films as described for Comparison Example A. The sample were tested for properties as described for Comparison Example A and the results are shown in Table 5. In addition, stress relaxation was measured for Examples 4 and 5 and Comparison Example A using the Instron Model 1122 Universal Test Machine and determined as previously described. The results are reported in Table 5.

The compositions of Examples 4 and 5 have improved modulus and stress relaxation in comparison to Comparative Example A.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

TABLE 4

| Example | A | 4 | 5 |
|---|---|---|---|
| S-EB-S block copolymer a) | 63 | 41.5 | 41.5 |
| Metallocene polyolefin | | | |
| 1 b) | | 41.5 | |
| 2 c) | | | 41.5 |
| Tackifying resin d) | 17 | 17 | 17 |
| Crystalline Polyolefin e) | 20 | 0 | 0 |

a. Shell KRATON ® G1659 polymer sold by Shell Chemical Co.
b. Engage ® EG 8150 polymer (25% octene, dens. 0.868) manufactured by Dow Chemical Co.
c. Exact 4038 polymer manufactured by Exxon Chemical Co., USA.
d. Regalrez 1126 resin manufactured by Hercules
e. Petrothene NA 601-04 resin sold by Quantum Chemical.

TABLE 5

| Example | A | 4 | 5 |
|---|---|---|---|
| Melt flow, 190° C./2.16 KG | 16 | 2.3 | 27 |
| Hystersis | | | |
| Recoverable energy, % | 67 | 67 | 63 |
| Stress @150% extension | 198 | 225 | 247 |
| Hysteresis set, % | 14 | 15 | 16 |
| Unloading stress, psi | | | |
| Cycle 1 | 134 | 145 | 152 |
| Cycle 2 | 130 | 142 | 148 |
| Tensile properties | | | |
| Tensile strength, psi | 1380 | 1438 | 1307 |
| Ultimate elongation, % | 950 | 970 | 1140 |
| 100% modulus, psi | 190 | 195 | 221 |
| 300% modulus, psi | 274 | 320 | 340 |
| 500% modulus, psi | 420 | 532 | 490 |
| Stress relaxation, % (after 30 min at 160% elongation and at 20 in/min crosshead speed) | 34 | 30 | 32 |

What is claimed is:

1. An elastic film having recoverable energy greater than 60%, comprising:

from 25% to 70% by weight of a block copolymer having at least two monoalkenyl arene blocks separated by a hydrogenated conjugated diene block;

from 15% to 60% by weight of the polymer components of an elastomeric polyolefin having a density from 0.86 to 0.91 and a molecular weight distribution having a polydispersity less than 3, wherein the elastomeric polvolefin is produced by polymerizing ethylene and from 8% to 30% by weight of an α-olefin comonomer having from 4 to 12 carbon atoms with a metallocene catalyst;

from 0% to 25% by weight of a crystalline polyolefin; and a from 15% to 28% by weight of a tackifying resin.

2. The film of claim 1, wherein the block copolymer has the structure styrene-poly(ethylene-butylene)-styrene.

3. The film of claim 1, further comprising an extending oil.

4. The film of claim 1, wherein the comonomer in the elastomeric polyolefin is butene.

5. The film of claim 1, wherein the comonomer in the elastomeric polyolefin is octene.

* * * * *